United States Patent [19]
Herrera

[11] 3,744,397
[45] July 10, 1973

[54] APPARATUS FOR PRODUCING A BEVERAGE

[76] Inventor: Juan Hernandez Herrera, 1240 W. 24th Street, Hialeah, Fla. 33012

[22] Filed: Dec. 17, 1970

[21] Appl. No.: 99,138

[52] U.S. Cl. .................................................. 99/293
[51] Int. Cl. ............................................. A47j 31/00
[58] Field of Search ..................... 99/292, 293, 294, 99/71, 306, 304

[56] References Cited
UNITED STATES PATENTS

| | | | |
|---|---|---|---|
| 1,885,666 | 11/1932 | Wood | 99/306 |
| 1,887,354 | 11/1932 | Kapner | 99/306 |
| 2,111,777 | 3/1938 | Hols | 99/306 |
| 2,621,581 | 12/1952 | Varney | 99/292 |
| 2,856,843 | 10/1958 | Miklas | 99/306 |

*Primary Examiner*—Robert W. Jenkins
*Attorney*—John Cyril Malloy

[57] ABSTRACT

Apparatus and a method for producing a beverage in which a lower utensil includes a dispensing spout and will initially contain a relatively small quantity of steam injected into it, or preparation water to be boiled or steamed through an overlying foraminous compartment element containing a measured quantity of a beverage-producing ingredient such as coffee, tea etc., the steam passing through a second foraminous bottomed container including a substantially greater quantity of preparation water; and the method consisting of injecting the steam into the lower utensil or boiling the preparation water in the lower utensil to create steam, and steaming it through the beverage-producing ingredient until the water in the upper container boils, and, thereafter, removing heat from the lower utensil resulting in the boiled water being sucked through the beverage-producing ingredient back into the utensil by means of which a beverage infusion is prepared.

4 Claims, 1 Drawing Figure

PATENTED JUL 10 1973
3,744,397
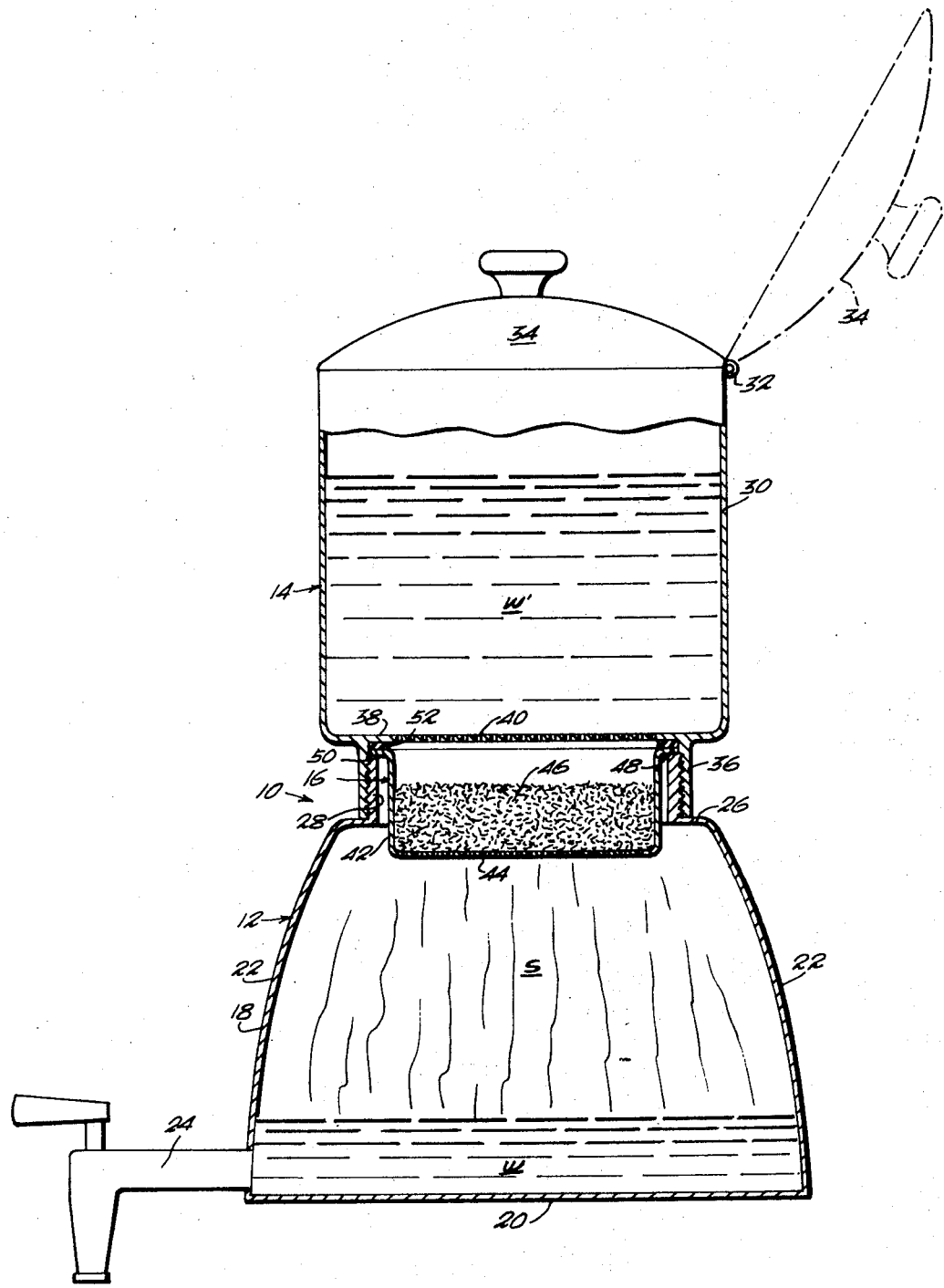
INVENTOR.
JUAN HERNANDEZ HERRERA
BY John Cyril Malloy
ATTORNEY.

APPARATUS FOR PRODUCING A BEVERAGE

BACKGROUND OF THE INVENTION

1. Field of the Invention

This invention relates generally to a novel apparatus for producing beverage infusion.

2. Description of the Prior Art

There are many different types of apparatus for producing a beverage infusion on both a commercial and personal or household basis. Common types of beverage production are, for example, perculation, drip or filtration types, measuring a quantity of "instant" ingredient with hot water, as well as involved "Expresso" coffees. A true connoisseur of coffee or tea is in constant search for better tasting beverage. Theoretically, coffees should only be produced by passing water through the grounds, for example, once. Continual circulation of the beverage-producing water causes a relatively bitter taste and apparently leaches out acid ingredients and excessive oils etc. Coffee without any type of sweetening, cream etc. produced properly has a relatively sweet and true coffee taste which is highly desirable.

SUMMARY OF THE INVENTION

This invention particularly relates to novel apparatus for isolating the ingredient used to produce a beverage infusion. It utilizes steam to pre-treat the ingredient such as coffee, tea etc. and, thereafter, causing water or the like to be passed through the infusion material to boil, and thereafter causing the boiled water to pass through the beverage-producing ingredient only once, and due to the pre-steaming or treating the best essence of coffee, tea etc. is obtained.

These together with other objects and the nature and advantages of the invention will become apparent from a consideration of the following description when taken in conjunction with the drawing forming a part thereof, wherein:

BRIEF DESCRIPTION OF THE DRAWING

The FIGURE of the drawing shows in vertical section the apparatus of the invention which is used to effect the novel method.

The apparatus is indicated generally at 10 and comprises a lower utensil member 12, an upper container member 14 and an intermediate compartment member 16.

The cooperating parts are produced for many suitable material including stainless steel, fireproof plastics, ceramics, etc., etc.

The utensil member 12 comprises a hollow body 18 including a transverse or flat bottom 20 integral with upwardly converging sidewalls 22. Although the utensil is illustrated as being of the type to be heated on a gas or electric burner, for example, an integral heating unit of the immersion type could be utilized.

Suitably connected to the wall 22 is a dispensing spout assembly 24. The wall 22 terminates in an upper inwardly turned shoulder 26 and an axial or vertically extending, externally threaded sleeve 28.

The container member 14 comprises a hollow body 30 having suitable hinge at 32 a displaceable lid 34. The body 30 includes a lower axially extending and internally threaded sleeve 36 removably engageable with the threaded sleeve 28 of the utensil member. Although threaded connections are illustrated, equivalent seal connections may be utilized. Above the sleeve 36 and integral with the wall 30 is a transverse bottom 38 including an intermediate screen-like foraminous portion 40 through which water will pass, but which is of a size to generally prevent the beverage-producing ingredients such as coffee grounds, tea etc. passing therethrough.

The compartment member 16 includes an annular sidewall 42 integral with a lower foraminous bottom 44 preferably is of a screen material or the like generally of a smaller gauge than the openings in the foraminous member 40. This likewise prevents the beverage-producing ingredient 46 from passing therethrough. However, steam and water will readily pass through the openings in the foraminous portion 44. The sidewalls 42 terminate in an upper annular flange or shoulder 48 which rests on the upper edge or end 50 of sleeve 28 of the utensil member. Interposed on the upper surface of the shoulder 48 is an annular gasket 52 which is engaged by the undersurface of the bottom 38 of the compartment member.

The method is carried out by introducing steam into the member 12 or more often by installing in the utensil member 12 a generally small quantity of preparation water W i.e., perhaps one-fourth of the final quantity, measuring a predetermined quantity of the beverage-producing ingredient and inserting it into the compartment member 16, and thereafter measuring in a separate container (not shown) the remaining amount of water W' to be used in preparing the beverage. Clearly, instead of using ground coffee at 46, coffee beans and various mixtures and types of coffee materials may be used so long as practical for use in the present apparatus.

The utensil member 12 together with the other parts as assembled placed over a suitable heat source, and the water W is heated until it boils so that the steam S thereof passes vertically through the foraminous bottom 44 of the compartment member 16 steaming and pre-treating the beverage-producing ingredient 46.

When the steam is noticeable, the measured quantity of water W' is poured into the container member 14 and the steam will prevent the water from passing through the foraminous bottom 40, but on the contrary, the steam will cause the water W' to heat rapidly and ultimately boil. When the water W' is boiling in the compartment member 14, the lid 34 being preferably in the solid line "closed" position, the assembly is removed from the heat source, and this will indicate that the reverse cycle should be effected. When the assembly is removed or heat is no longer applied, due to the formation of steam, condensation or cooling will cause a partial vacuum within the utensil member 12, causing the water W' to pass into the utensil carrying with it an infusion of the beverage which is unsurpassed in taste and quality.

What is claimed is:

1. An assembly for brewing an infusion of a beverage comprising in combination:
    a lower utensil for containing an initial quantity of liquid and the ultimate quantity of brewed beverage;
    an upper container for containing the remaining portion of the water to be combined with the initial quantity of water;
    said lower utensil and upper container including means connecting the same in axial communicating relation; and defining an axially open through passageway therebetween; and a compartment member in said passageway and completely spanning the cross sectional area thereof for containing a measured quantity of a beverage-producing ingredient from which an infusion will be produced, said means connnecting sealingly and removably retaining said compartment member interposed between said utensil and container, said utensil and said compartment member respectively including overlying foraminous bottoms whereby liquid in said utensil can by application of a heat source be steamed upwardly through said container, passing through said ingredient and into the container to boil the liquid therein, and, when cooled, will ultimately be drawn back through the beverage-producing ingredient by the reduction of relative pressure in the utensil and the container on removal of the heat source, whereby the ultimate beverage infusion resides in the utensil after it is no longer heated.

2. The structure as claimed in claim 1 in which said means for connecting comprises complementary axial telescope sleeve portions, said compartment element depending axially from said sleeve portions and into an upper portion of said utensil.

3. The structure as claimed in claim 2 in which said compartment member includes an annular, upper collar resting on the upper edge of the axial sleeve of said utensil, a gasket element interposed between said collar and the undersurface of the bottom of said container adjacent the upper end of the axial sleeve of said container.

4. The structure as claimed in claim 1 in which said container includes a displaceable lid and said utensil includes a lower dispensing ssembly.

5. A method for producing beverage infusion comprising the steps of:

A. measuring a quantity of liquid into a utensil,
B. measuring a quantity of a beverage-producing ingredient into a foraminous container and in sealed relation above the liquid in said utensil;
C. measuring an additional quantity of liquid, greater than the first measured quantity, into a container communicating with said ingredient;
D. heating the liquid in said utensil and steaming it through said ingredient until the additional liquid boils; and
E. removing the heat after the additional liquid has boiled and permitting all of the liquid to be drawn through the pre-steamed ingredient and into said utensil.

* * * * *